United States Patent [19]

Rohrbacker et al.

[11] Patent Number: 5,304,272
[45] Date of Patent: Apr. 19, 1994

[54] METHOD FOR MANUFACTURE OF PROCESS PRINTED SURFACE COVERING

[75] Inventors: Peter J. Rohrbacker, Bordentown; Martin J. Dickson, Newfield, both of N.J.

[73] Assignee: American Biltrite, Inc., Lawrenceville, N.J.

[21] Appl. No.: 743,548

[22] Filed: Aug. 12, 1991

[51] Int. Cl.$^5$ .............................................. B31F 1/22
[52] U.S. Cl. .................................. 156/209; 156/231; 156/235; 156/246; 156/280; 156/313; 156/277; 427/197
[58] Field of Search ............... 156/277, 280, 289, 209, 156/313, 220, 219, 231, 235, 247, 250, 253, 501; 425/132, 119; 427/197

[56] References Cited

U.S. PATENT DOCUMENTS

| | | | |
|---|---|---|---|
| 3,465,384 | 2/1967 | Barchi et al. | 264/40.2 |
| 4,225,374 | 9/1980 | Kaufmann | 156/220 |
| 4,305,768 | 12/1981 | Lontz | 156/324 |
| 4,312,686 | 1/1982 | Smith et al. | 156/209 |
| 4,483,732 | 11/1984 | Penta et al. | 156/247 |
| 4,552,606 | 11/1985 | Colyer et al. | 156/246 |
| 4,612,074 | 9/1986 | Smith et al. | 156/85 |
| 4,678,528 | 7/1987 | Smith et al. | 156/220 |
| 4,773,959 | 9/1988 | Smith et al. | 156/220 |
| 4,804,429 | 4/1989 | Appleyard et al. | 156/209 |
| 4,844,849 | 7/1989 | Miller et al. | 264/46.4 |

*Primary Examiner*—Patrick J. Ryan
*Assistant Examiner*—Merrick Dixon
*Attorney, Agent, or Firm*—Pennie & Edmonds

[57] ABSTRACT

A printed surface covering which can be continuously manufactured by the following steps: utilizing a process printing method, a design is printed onto a polymer web having an opaque, uniform background color; this web is laminated onto a vinyl base web to form a composite material; this composite material is laminated to a wear resistant layer which is embossed in register with the printed design; and the embossed composite material is cut into discrete sections in register with the printed design.

9 Claims, 4 Drawing Sheets

METHOD FOR MANUFACTURE OF PROCESS PRINTED SURFACE COVERING

BACKGROUND OF THE INVENTION

This invention relates to a printed and embossed material, suitable for use as a floor covering and a method and apparatus for making it in a continuous process. More particularly, it concerns a multilayered material combining a base layer, a preprinted vinyl layer and a wear resistant layer, which is embossed in register with the print.

Reverse printed laminates have been made by laminating separate sheets of calendared base material and a preprinted plastic film. Until recently, in continuous processes the printed designs have been limited to random prints because of the difficulty of maintaining the desired dimensions in the preprinted plastic film in the laminate and in some cases in the base material. The plastic film tends to stretch when it is being printed and subsequently dried. Since it is necessary to apply tension to the printed film during lamination in order to eliminate trapped air and wrinkles, the printed design can also be distorted during lamination.

Alternatively, tiles can be formed in batch processes with designs that are in register to the cut tile by laminating preprinted plastic sheets having silk screen designs to sheets of a suitable base material. The tiles can then be hand clicked from the sheets. The high cost of such a batch process makes in-register printed tile quite expensive and limits its acceptance.

An additional complication is imposed by the desirability of providing a textured surface by embossing the tile. Because the embossing step can be another cause of distortion, some processes are limited to embossing of a plastic surface layer that is integral with a nonplastic stable substrate such as asbestos or asphalt-saturated felt.

As described in U.S. Pat. Nos. 4,312,686, 4,612,074, and 4,773,959, and U.S. Pat. application Ser. No. 07/428,262, now U.S. Pat. No. 5,122,212 which are incorporated herein by reference, the distorations which occur during printing and laminating are minimized by printing the design on a stable base, preferably release paper, and then transferring the printed design to a hot plastic web made continuously by an extruder. This hot plastic web is made from a mixture of vinyl chloride or vinyl acetate copolymer, mineral filler such as limestone, and small quantities of other ingredients. Additionally, scrap material from previously formed floor tiles is ground and added to the mixture to conserve materials, reduce waste and lower costs. The resultant mixture is typically bleached with titanium oxide to lighten the color.

After printing, a stress relieved protective wear coat is laminated to the printed web. The laminated web is then embossed with an engraving roll which is aligned to the laminated web by means of registration marks formed as part of the printing on the web. Additionally, these marks align a cutting means with the web so that individual tiles can be cut automatically in register with the printed and embossed pattern. A carrier belt supports the hot plastic web during the printing stage, the laminating stage and the embossing stage to avoid distortion thereof.

Although the method described above is commercially successful, it produces tiles having somewhat subdued colors because the background portion of the tile is made from a hot plastic web formed partially from scrap tiles of varying colors. Thus, the background color is not white even after bleaching, and this background color can distort and dull the color of the printing on the tiles. Further, tiles manufactured to have the same color can be inconsistent with one another if they are printed on webs of varying colors. This inconsistency results in tile in which the colors are not completely reproducible.

SUMMARY OF THE INVENTION

We have devised an improved process suitable for continuously producing tiles in which the color is true and consistent. A preferred embodiment of the improved process generally includes the following steps. A continuous hot plastic web is adhered to a carrier belt to reduce distortion in the web during processing as well as to maintain a constant positioning of the web. A preprinted white vinyl layer is laminated on the plastic web.

A white vinyl is chosen to provide a consistent and bright background as well as a smooth surface for printing. This vinyl is at least partially opaque in that when it is laminated onto the plastic web, the background color of the web does not distort the color of the printed tile. For the purposes of simplicity, this level of opaqueness will hereinafter be referred to as "opaque".

A transparent wear coat is laminated onto the printed white vinyl layer to complete the composite tile material, and this composite tile material is embossed using a conventional engraved roll having raised sections which are images of the printed design. The composite material is then cut into individual tiles.

The white vinyl layer is printed utilizing a process printing method. Process printing provides a printed design having sharp, vivid colors, and can be accomplished by separating a design to be printed into a series of homogeneous color images of that design. Each of these color images is printed separately on the white vinyl layer in an overlapping manner to produce a visual effect of all of the intermediate shades of the design.

Process printing is based on the Young-Helmholtz theory of three-color vision. According to this theory, any color can be produced by a mixture of the primary colors: blue, red and green. However, in process printing, inks are chosen so that they absorb one of the primary colors while reflecting the other two. Thus, the subtractive primary colors are utilized: magenta, yellow and cyan. Magenta absorbs green and reflects blue and red; yellow absorbs blue and reflects red and green; and cyan absorbs red and reflects green and blue. From combinations of these colors, all intermediate shades of color can be produced in process printing except black. Black is provided as a fourth printing color and is often used for shadowing in process printing.

In preferred embodiments, a color image of each of the three subtractive primary colors and black are printed separately on the white vinyl layer to form the printed design. Separate engraving rolls are used to print each of the four color images onto the vinyl in a predetermined overlapping arrangement so as to produce all of the intermediate shades of the design.

The advantages of this process are as follows. The addition of the opaque white vinyl layer to the web provides a consistent and reproducible white background which eliminates the dull and distorted colors produced by current printing methods. Rather, the colors are brilliant and sharp. Process printing provides an efficient and economical method for printing surface covering designs because it requires only four engraving rolls to produce all intermediate shades. In current printing processes, a separate engraving roll is used for each color to be printed. Thus, as the tile designs become more colorful, the cost of the engraving rolls can become prohibitive. Further, the present invention eliminates the need to bleach the base material before use, thus reducing cost and processing steps.

BRIEF DESCRIPTION OF THE DRAWINGS

These and other objects, features and advantages of the present invention will be more readily apparent from the following detailed description of a preferred embodiment of the invention in which.

DESCRIPTION OF THE PREFERRED EMBODIMENTS

Figure 1:
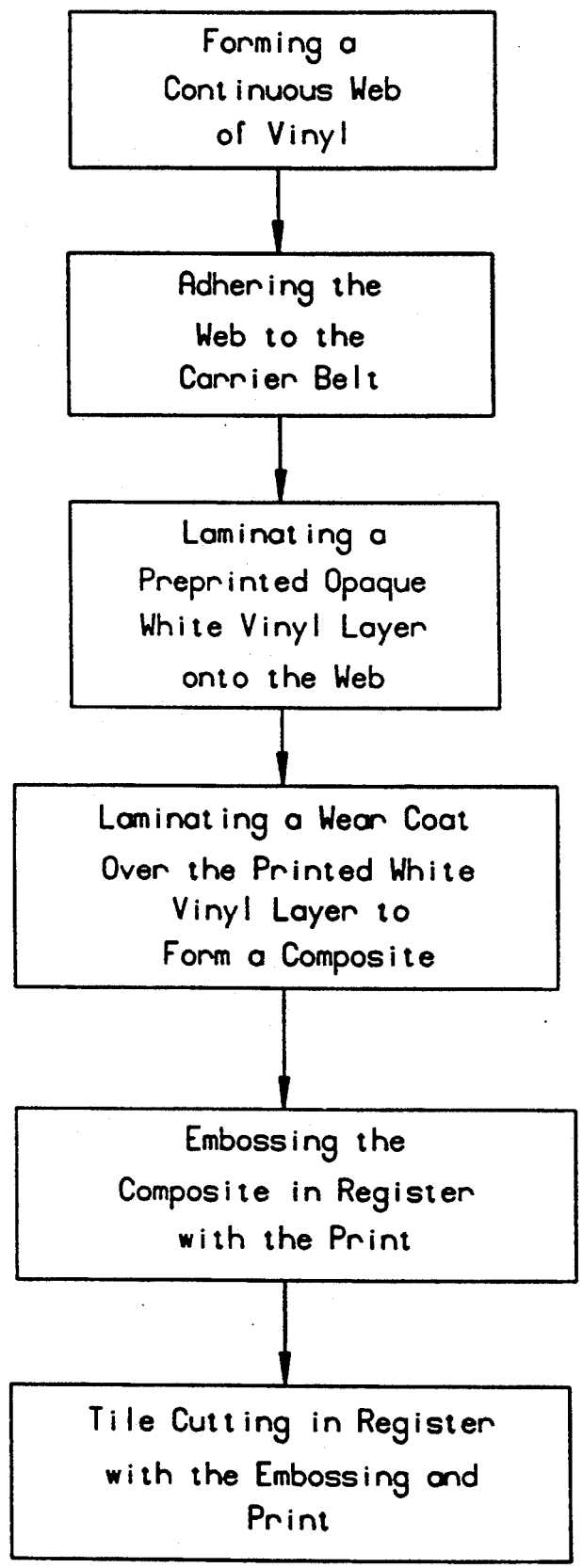
FIG. 1 is a block diagram illustrating the major steps followed in the practice of our invention.
Figure 2:
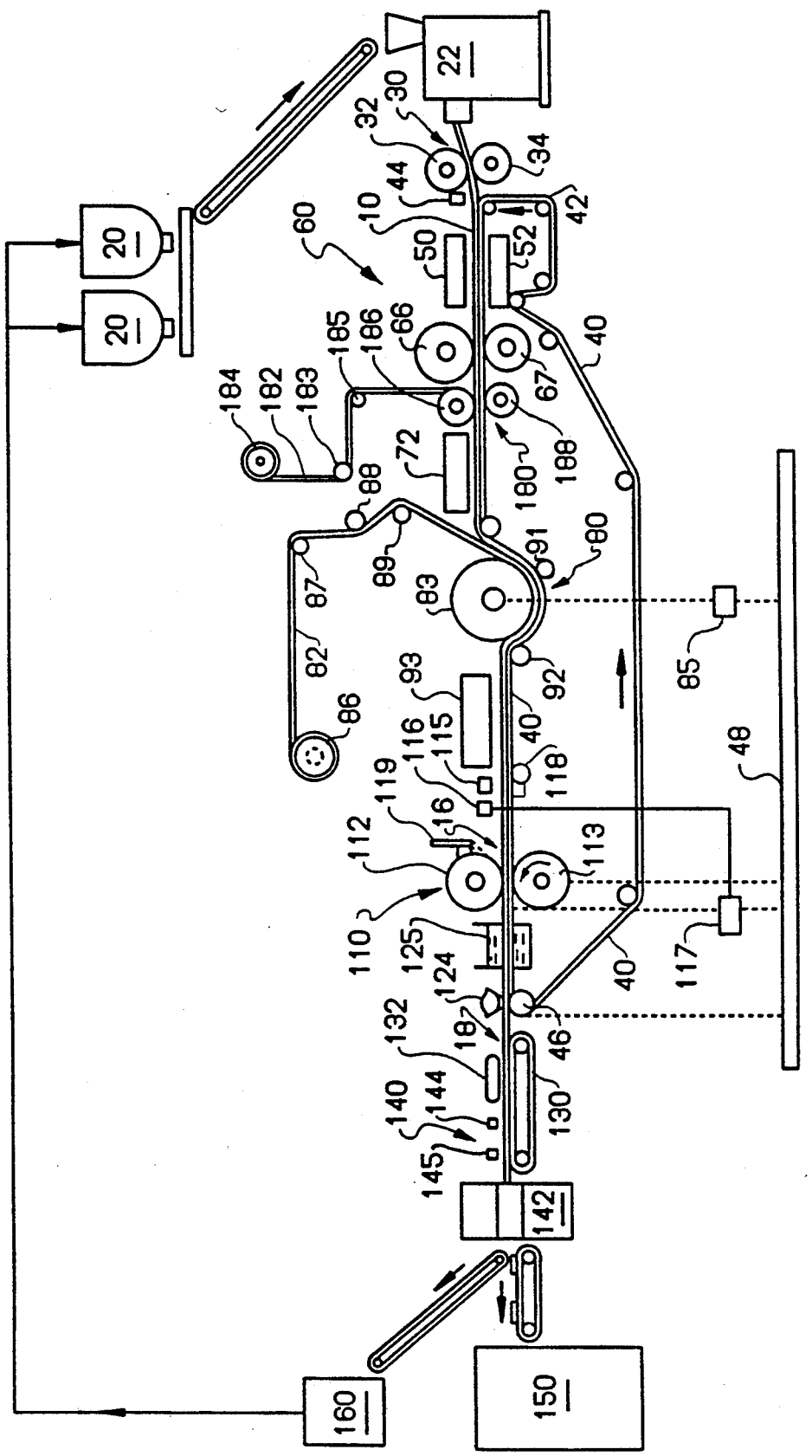
FIG. 2 is a schematic diagram of a preferred embodiment of the overall system apparatus used in the practice of our invention.

FIGS. 1 and 2 illustrate a preferred method and apparatus for practicing our invention to make a vinyl tile on which a layer of printed white vinyl and a protective wear coat has been laminated onto a base web, and has been embossed in register with the print. Substantial portions of this method and apparatus are similar to those described in the '686, '074 and '959 patents and U.S. Pat. application Ser. No. 07/428,262.

As shown in FIG. 1, the method of making a floor tile of the invention comprises the following steps: forming a continuous web of vinyl, adhering this web to a carrier belt, laminating a preprinted opaque white vinyl layer onto the web, laminating a protective wear coat over the printed white vinyl layer to form a composite, embossing the composite in register with the print, and tile cutting in register with the print.

In accordance with the invention, the composite is embossed in register with the print while maintaining proper tension in the web as it is fed into the embossing roll. Preferably, the embossed laminate is partially annealed before cutting; and further annealed after cutting. Infrared heating is used to maintain appropriate temperatures in the web, white vinyl layer and the wear coat for adhering the web to the carrier belt, laminating the opaque white vinyl layer and the protective wear coat, and pre-annealing the composite. This heating can also be accomplished by standard hot air heaters. Final annealing of the composite is accomplished in a hot air oven.

The composition of the individual layers will be apparent to those skilled in the art from the teaching of the '686 patent; the specific temperatures for performing many of the various steps of the process will be apparent from the teaching of the '959 patent.

Figure 4:
FIG. 4 is a cross-section of a base web used in the practice of our invention.

Specific apparatus for performing the steps of FIG. 1 is illustrated in FIG. 2. A continuous hot melt base web is prepared by blending its constituents comprising raw ingredients and scrap from already formed tiles in blenders 20 and supplying the mix to a continuous mixer 22. A hot melt is continuously supplied from mixer 22 to a calendar 30 comprising a pair of rolls 32, 34 which produce a continuous hot melt base web 10. As is known in the art, a doctor knife (not shown) may be used to separate base web 10 from the calendar rolls. A cross-section of a portion of base web 10 as it leaves the calendar rolls is depicted in FIG. 4. The thickness of this cross-section typically ranges from approximately 0.75 to 3.0 mm. In apparatus where a single 12-inch square tile is manufactured at a time, this cross-section is approximately 35 cm in width. Of course, other dimensions may be used in the practice of the invention.

As described in the '686 patent, hot plastic web 10 flows continuously onto a moving carrier belt 40 which is made of a material such that the web will adhere to the belt when the web is hot, but can be easily removed when the web is cool. Typically, the belt 40 is made from a woven fiberglass impregnated with a silicone elastomer. Carrier belt 40 moves base web 10 through the adhering, laminating and embossing stages, supporting the web during these processing steps. The belt is driven by a drive roll 46 which is driven by a conventional line shaft 48. To avoid distorting the plastic web, a guidance system 42 is utilized to guide and align the web by performing continuous adjustment on the carrier belt. A loop speed sensor 44, positioned near calendar 30, is used to maintain the carrier belt at a constant speed as the hot melt web leaves calendar rolls 32, 34.

As the web moves away from calendar 30, it is heated to approximately 121° C., the temperature required to adhere the web to the carrier belt. A first infrared heater 50 heats web 10 directly and a second infrared heater 52 heats carrier belt 40 which, in turn, heats web 10. The web 10 enters an adhering station 60 where it is fed along belt 40 through a second calendar formed by adhering rolls 66, 67 which apply approximately 50-150 pounds per linear inch (pli) of pressure to web 10 and belt 40 as they pass therethrough. As a result, web 10 is pressed and adhered to carrier belt 40. As described above, the carrier belt is constructed so that the web will adhere thereto when heated, but can be easily removed when cooled. Also, we have found it useful to cool adhering roll 66 to prevent the roll from sticking to web 10.

Adhering the web to the carrier belt eliminates the problem of back-calendaring which can occur if the adhering is performed during the laminating stages. Back-calendaring is generally encountered where heavy gauges are passed through a set of rollers. By adhering the web to the carrier belt prior to laminating, lateral and transverse distortions of the web are eliminated. As a result, production line throughput is greatly increased and product quality is improved.

Next, the web enters a laminating station 180 that laminates a layer of preprinted opaque white vinyl 182 to web 10. The white vinyl layer can have any kind of design printed thereon (the printing process will be described below). For high-volume commercial production of tiles, the design is preferably one that permits tiles to be cut with the design centered in the tile so that it is in register with the edges of the tile. Laminating station 180 comprises laminating rolls 186, 188, a supply roll 184, and guides 183, 185. The preprinted white vinyl has good dimensional stability to prevent stretching or other forms of distortion and is fed from supply roll 184, through guides 183, 185 and through laminating rolls 186, 188. Since rolls 66, 67 in the previous stage have already adhered the web to the support belt, there is no need to operate laminating rolls 186, 188 at comparable pressures, and we have found that satisfactory laminating is achieved when the rolls are operated at pressures of approximately 10–30 pounds pli. Because a relatively low pressure is exerted by the laminating rolls, it also is not necessary to cool rolls 186, 188 to prevent sticking.

To ensure proper alignment during lamination of the white vinyl in a transverse direction, an edge guidance system (not shown) is used. Moreover, conventional splicing equipment (not shown) is used to splice individual rolls of preprinted white vinyl to form one continuous roll at supply roll 184. This equipment comprises an unwind roll stand, a splice table and a compensator that allows time to splice the printed design in register.

The layer of white vinyl is laminated by first passing it through guide 183 which aligns the preprinted vinyl with the plastic web. Illustratively, guide 183 is a Fife edge guide.

Figure 5:
FIG. 5 is a cross-section of a base web after a printed white vinyl layer has been laminated over the base web in accordance with our invention.

Vinyl layer 182, web 10 and carrier belt 40 next pass through the nip formed by laminating rolls 186, 188. Infrared heater 72 is positioned directly above the vinyl layer and heats the vinyl layer to 160° C., a temperature suitable for laminating the vinyl layer to the web. A cross-section of the composite depicting base web 10 and white vinyl layer 182 is shown in FIG. 5. The thickness of the white vinyl layer is approximately 0.04 to 0.13 Mm compared to the 0.75 to 3.0 mm thickness of base web 10.

The web is next fed into another laminating station 80 where a protective wear coat comprising a web 82 of transparent vinyl film is laminated to the printed side of white vinyl layer 182. Laminating station 80 comprises a heated rotating drum 83, a high intensity infrared heater 93, a web guide 89, a supply roll 86, and rollers 87, 88, 91 and 92. In addition, the station preferably includes conventional splicing equipment (not shown) including an unwind roll stand, a hot splicer and a compensating device which allows time to splice the film onto supply roll 86.

Drum 83 is driven by line shaft 48 which is coupled to the drum by means of a speed control 85 such as a Specon (Reg. T.M.) speed control manufactured by Fairchild Hiller. As described in the '074 and '959 patents, the speed control 85 regulates the speed of the drum relative to that of the embossing roll and backup roll.

Supply roll 86 provides a continuous web 82 of preformed vinyl film used as a protective wear coat. Typically, the vinyl film is from 0.075 to 0.5 mm in thickness. Web 82 passes through web guide 89 which moves web 82 in a transverse direction so that web 82 is in register with the printed web. Illustratively, web guide 89 is a Fife edge guide.

Figure 6:
FIG. 6 is a cross-section of the base web and printed white vinyl layer after a transparent wear coat has been laminated over the printed white vinyl layer.

Web 82, printed white vinyl layer 182, web 10 and carrier belt 40 pass through the nip formed by rotating drum 83 and roller 91, and web 82 is pressed and laminated by drum 83 atop of the printed white vinyl layer. These layers adhere to carrier belt 40 and strip away from rotating drum 83 at roller 92. Carrier belt 40 transports the web to infrared heater 93 which heats the protective vinyl film and, therefore, the composite web. For the films used in the practice of the preferred embodiment of the invention, the temperature of web 82 is raised by an infrared heater 93 so that the vinyl film is stress relieved and forms a composite 16 in which the printed white vinyl layer 182 is located between the web and wear coat 82, as depicted in FIG. 6.

Figure 7:
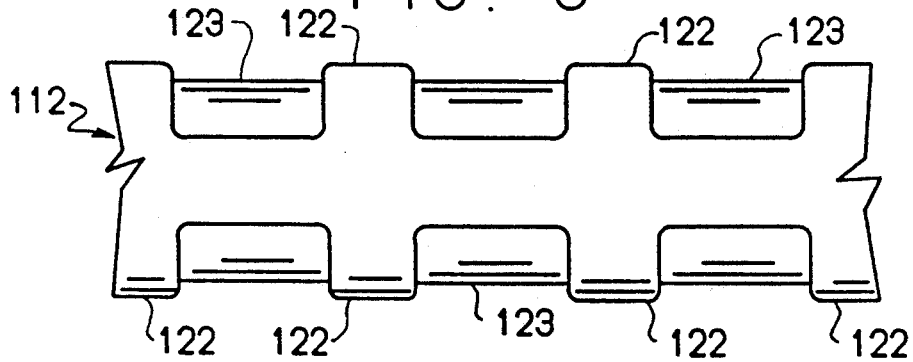
FIG. 7 is a view of an embossing roll used in the practice of our invention.

The carrier belt then moves the composite to an embossing station 110. This station comprises an embossing roll 112, a rubber backup roll 113, and means for transverse and longitudinal positioning of the laminated web. As shown in FIG. 7, embossing roll 112 is an engraved or etched steel or copper roll having areas 122 that are raised above other areas 123 on the roll. Typically the difference in height between areas 122 and 123 averages about 0.15 to 0.35 mm. Preferably, areas 122 constitute an image of the design that is printed onto the composite web. Both the embossing roll and the backup roll are water cooled to prevent sticking.

The positioning means mentioned above includes two electric eyes 115, 116, a speed control means 117 and a positioning roll 118. Backup roll 113 is driven directly by line shaft 48 so that its surface speed is the same as that of drive roll 46. Embossing roll 112 is also driven by line shaft 48 but its speed is controlled by speed control means 117. The electric eyes sense registration marks which are printed on the web along with the printed design. Electric eye 115 controls positioning roll 118 which guides composite 16 in the transverse direction so that the embossing roll areas 122 are in register with the images on the composite web. Electric eye 116 is connected to speed control 117 and controls the phase of the embossing roll so that embossing roll areas 122 are in register in the longitudinal direction with the printed pattern on the composite web. Specific apparatus for producing transverse and longitudinal registration with the embossing roll include a Fife photoelectric line control and a Bobst Champlain registron control, respectively. Numerous other devices will be apparent to those skilled in the art.

Figure 8:
FIG. 8 is a cross-section of the base web, printed white vinyl layer and wear coat after it has been embossed in register with the print by the embossing roll of FIG. 7.
Figure 9:
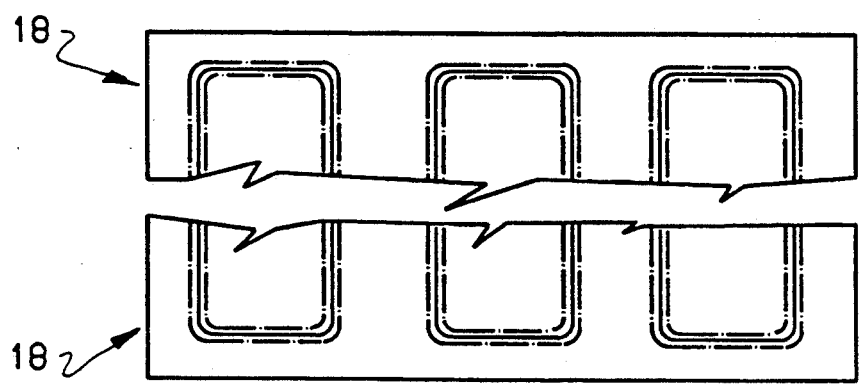
FIG. 9 is a plan view of a tile which has been embossed in register with the print using the embossing roll of FIG. 7.

The outer surface of embossing roll 112 is cooled directly by a water spray 119, and this spray also cools the upper surface of composite 16. Water spray 119 cools and sets composite 16 so that stretching of composite 16 by rolls 112 and 113 is minimized. Also, applying water to roll 112 reduces the likelihood that composite 16 will adhere to roll 112. Composite 16 and belt 40 pass through the nip defined by embossing roll 112 and backup roll 113, and raised areas 122 of the embossing roll form corresponding depressions in the composite. A cross section of an embossed composite 18 as formed by this step is shown in FIG. 8 and a plan view in FIG. 9.

We have found it advantageous to control the surface speed of rotating drum 83 relative to that of embossing roll 112 and backup roll 113 so that the surface speed of drum 83 is about 98 to 99% of that of rolls 112 and 113 and preferably is about 98.2%. Advantageously, this speed relation can be maintained by setting speed control 85 so that its output rotational shaft speed is in the range of 98 to 99% of its input rotational shaft speed which is the same rotational speed as that of line shaft 48. With this speed relationship, we have found that appropriate tension is produced in composite 16 so that the composite does not become distorted either by bunching up, which causes lateral expansion in the direction transverse to the direction of travel of the web, or by stretching in the direction which is the same as the direction of travel of the web. As a result, production line throughput is greatly increased and product quality is improved.

After passing through the nip formed by rolls 112 and 113, embossed composite web 18 is cooled to a temperature sufficient to allow the composite web 18 to be stripped from carrier belt 40. Preferably, this cooling operation is accomplished by immersing composite 18 and belt 40 in a water bath 125. After immersion, excess water is removed from the web by a high velocity air knife 124 and the composite web is stripped from carrier belt 40.

At this point the carrier belt 40 reverses direction and continues along a circular path to a position just prior to the heaters 50, 52 where it picks up the hot melt web again. The composite web, however, moves onto a conveyor belt 130 which carries it through a pre-annealing station 132 which partially removes the strains imparted by laminating and embossing. After pre-annealing, the web is again cooled. It then enters a tile cutting station 140 where it is aligned and cut into tiles in register with the pattern printed on the web. Tile cutting station 140 comprises a tile cutter 142, electric eyes 144, 145, and equipment responsive to signals from the electric eyes for aligning the web in the transverse and longitudinal directions.

Specific apparatus for aligning composite 18 to be cut will be apparent to those skilled in the art from the teaching of U.S. Pat. No. 3,465,384, entitled "Apparatus for Registration of Plastic Web", which is incorporated herein by reference. As disclosed in that patent, a plastic web is fed on a conveyor belt into a tile cutter. Photocells are used to maintain the desired transverse position of the plastic web by means of a reversible motor that controls the lateral position of the conveyor. The photocells sense the lateral position of the plastic web by sensing a continuous longitudinal stripe that is embossed in the plastic web. In like fashion in the present invention, electric eyes 144, 145 sense registration marks that are printed on the web along with the printed design. Advantageously, these registration marks can be the same as those used to align the web at the embossing station. Numerous closed loop feedback systems for control of both lateral and longitudinal position of the web will be apparent to those skilled in the art.

The tiles are cut so that they are slightly oversize. They are then annealed in an annealing oven 150 to shrink them to their proper size. Finally they are cooled to ambient temperature and packaged for shipment. Scrap from the tile cutting operation is fed to a granulator 160 and returned to blenders 20 to be ground up to a powder suitable for use as a portion of the continuous base web.

Figure 3:
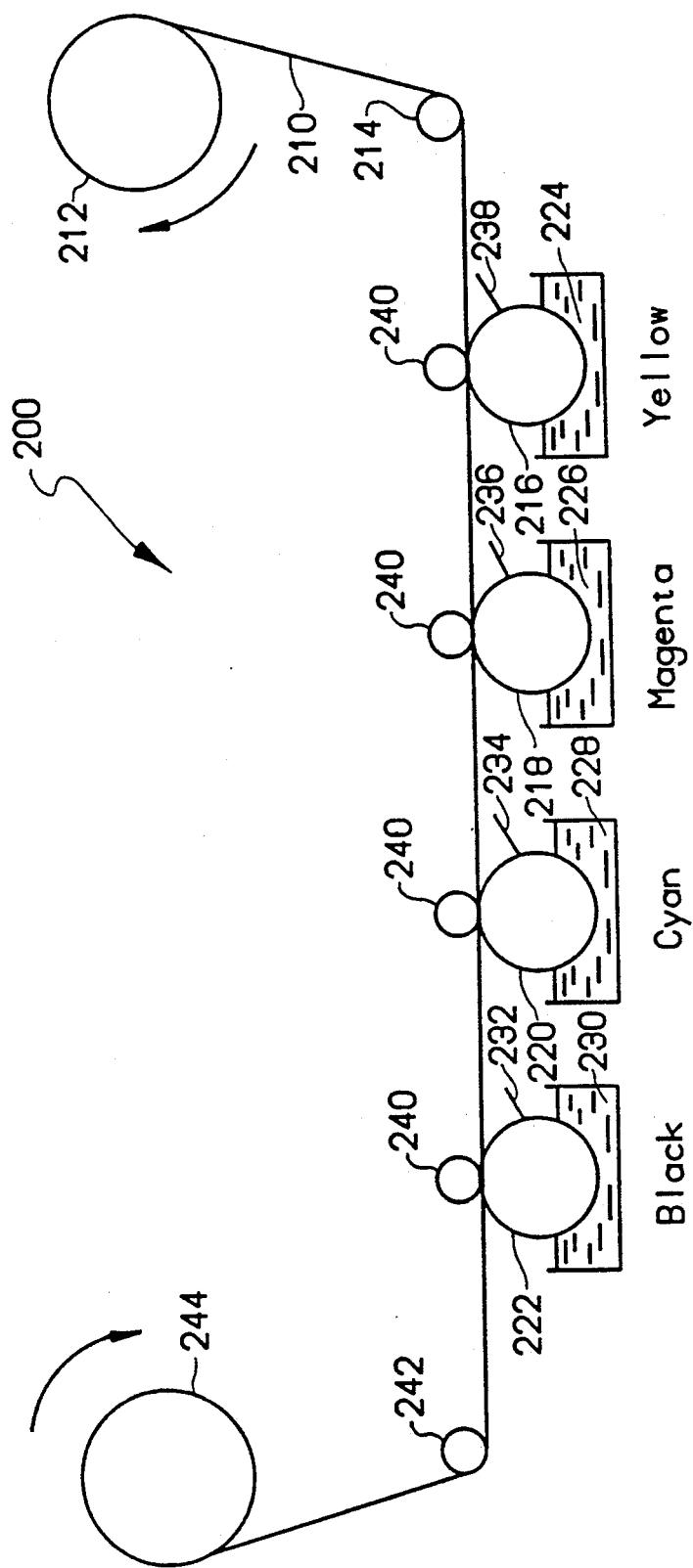
FIG. 3 is a schematic diagram of a preferred embodiment of the white vinyl printing apparatus used in the practice of our invention.

FIG. 3 depicts a preferred process printing apparatus, generally designated 200, for printing a design on an opaque white vinyl web 210. A feed roll 212 supplies a continuous web of a rigid opaque white vinyl (typically a low plastic vinyl) to the apparatus. The vinyl is selected to have a rigidity which provides a suitable dimensional stability to allow for a low tolerance registration process for the purposes of printing thereon. The vinyl is chosen so that the background of the printed matter is always opaque and white, thus the colors printed atop this layer remain true and reproducible. Further, the vinyl provides a smooth surface suitable for printing.

The rigid white vinyl web 210 is process printed as follows: the web is fed through a front guide 214 to maintain proper tension and alignment in the web, and is then fed through a series of four engraving rolls 216, 218, 220, 222. These engraving rolls are each supplied with a different color ink. The ink is supplied to the engraving rolls by ink baths 224, 226, 228, 230, and excess ink is removed from each roll by doctor blades 232, 234, 236, 238. The ink supply apparatus is well known in the art.

The rolls can each comprise one continuous pattern, or, alternatively, a plurality of different patterns spaced apart either circumferentially or axially on the engraving roll. These patterns can be utilized as in conventional process printing to print on the white vinyl layer all manner of designs from the simplest such as random patterns or solid colors to the most complicated such as full color reproductions of photographs, paintings, or computer-generated art work.

In preferred embodiments, the four inks are the three subtractive primary colors: yellow, magenta (blue and red), and cyan (blue and green), as well as black. The design to be printed is separated into four homogenous color images corresponding to the four ink colors of the engraving rolls, and each roll is engraved with a color image pattern of one of the ink colors. This process is generally called color separation and is well known in the art. Each of the four color images is printed from its engraving roll onto the white vinyl in an overlapping manner so that when viewed together, the individual color images combine visually to produce a desired color design on the white vinyl.

Illustratively, as depicted in FIG. 3, the white vinyl web 210 can be printed with yellow ink by engraving roll 216; next, the web having yellow ink printed thereon can be printed with an overlapping layer of magenta ink by engraving roll 218; similarly, the web having overlapping layers of yellow ink and magenta ink printed thereon can be printed with individual overlapping layers of cyan ink and black ink by engraving rolls 220 and 222, respectively. Thus, each color is applied separately to create the desired design on the web.

Rubber support rolls 240, in cooperation with the engraving rolls apply 10–60 pli of pressure to the composite web so as to make a clean print. When the printing process is completed, the printed white vinyl web 182 is fed through a rear guide 242 which is used in cooperation with front guide 214 to maintain a proper web tension, and is then wound around take-up roll 244. This roll is transferred to feed roll 184 (FIG. 2) by means of splicing (described above).

In preferred embodiments, these engraving rolls perform gravure printing wherein small depressions formed on the engraving rolls receive the specific color ink used on that roll. As described above, the excess ink (i.e. the ink which is not contained in the depressions) is wiped off the engraving rolls by doctor blades. The ink in the depressions form small "dots" on the surface to be printed as that surface contacts the engraving roll in the apparatus described above. Intermediate tones are produced when one of the engraving rolls prints a series of distinct dots, called halftones, of one of the subtractive primary colors and at least one other of the engraving rolls prints overlapping halftones of a different subtractive primary color adjacent to the first set of halftones. From these distinct points of color, the human eye will see a continuous color corresponding to a shade somewhere between the subtractive primary colors printed on the white vinyl.

To vary these intermediate tones, halftones of varying areas are printed on the white vinyl, thus exposing either less or more white to create deeper or more muted shades, respectively. Further, varying intermediate tones are produced by varying the design area covered by one of the subtractive primary colors with respect to another. The area of the halftone printed on the vinyl is dictated by the depth of the depression of the engraving roll. Thus by varying the colors and areas of the halftones, all intermediate colors can be produced by this process printing method.

Clearly, because process printing depends on the exact placement of halftones on the white vinyl film, a low tolerance registration procedure is critical. In this embodiment, the registration is such to maintain a +0.13 Mm printing tolerance. The registration procedure is accomplished by first printing registration indicia onto the white vinyl layer 182 as the design is being printed onto the vinyl layer; then, digitally controlling the position of the vinyl in both transverse and longitudinal directions by utilizing the printed registration indicia as a reference means to ensure proper placement of the individual color images on the vinyl.

Specifically, the registration apparatus senses the registration indicia, and aligns itself thereto by utilizing the digital means described above. Advantageously, these registration indicia can be used for registration procedures in tile-forming operations other than printing, such as the above-described operations of embossing and cutting.

Mechanical control systems described above are utilized to maintain a minimum of ink on the engraving rolls and thus maintain proper halftone application. Specifically, a doctor blade is used to limit the ink used in printing and to ensure the printing of distinct halftones which results in a printed layer measuring less than 0.01 mm on the white vinyl film.

As will be apparent, many of the individual pieces of apparatus used in practicing our invention are conventional. Extrusion equipment, heaters, adhering stations, laminating stations, embossing stations, die cutting equipment and aligning apparatus are old. However, the combination of this equipment utilized to process print on an opaque white vinyl layer to produce floor tile having vivid and reproducible color is new.

While the invention has been described in conjunction with specific embodiments, it is evident that numerous alternatives, modifications, and variations will be apparent to those skilled in the art in light of the foregoing description.

For example, the continuous web can be utilized to form sheet vinyl surface coverings as well as individually cut tiles. The white vinyl layer can be replaced by any film which is compatible with the base web, e.g., opaque white polyester, acrylic, urethane, acetate or thermoplastic elastomers (TPE's). The white vinyl layer or equivalents can be reinforced with either organic fibers such as cellulose, or inorganic fibers such as glass, polyester or acrylic. Alternately, the vinyl layer or equivalents can have another uniform background color which is not white. In this case, the printing inks are varied to accommodate this background color so that all the colors of the design can be printed onto the tile.

The process printing can be performed by a variety of printing methods in addition to gravure printing. Letterpress printing, lithographic printing and even screen printing are all acceptable methods of process printing. The transparent wear coat laminated atop the white vinyl is not always required, and can be eliminated or replaced with wear-resistant coatings such as poly-urethane.

What is claimed is:

1. A method for manufacturing a printed surface covering comprising the steps of:
    process printing a design on a continuous opaque polymer web of uniform color; and
    laminating said printed polymer web onto a continuous base web to form a composite web, said base web being positioned atop a moving support surface and comprising a vinyl material which is compatible with said polymer web.

2. The method of claim 1 further comprising a step of laminating a clear plastic wear layer over said printed polymer web.

3. The method of claim 1 wherein said step of process printing said polymer web comprises a four color proces printing technique utilizing color images of subtractive primary colors: cyan, magenta and yellow as well as black to create said printed design.

4. The method of claim 3 wherein said step of process printing further comprises a gravure printing method comprising printing each of said color images of said design separately on said polymer web in an overlapping manner as a series of halftones, wherein said halftones of each of said color images are printed adjacent to one another to create a visual effect of a continuous and varying color design, and said halftones of each of said color images are varied in number, position and area to produce every intermediate shade of color in said design.

5. A method for manufacturing a printed surface covering comprising the steps of:
    process printing a design on a continuous opaque polymer web of uniform color, said design comprising registration indicia for use in manufacturing; and
    laminating said printed polymer web onto a continuous base web to form a composite web, said base web being positioned atop a moving support surface and comprising a vinyl material which is compatible with said polymer web.

6. A method for manufacturing a printed surface covering comprising the steps of:
    process printing a design on a continuous opaque polymer web of uniform color, said design comprising registration indicia for use in manufacturing;
    laminating said printed polymer web onto a continuous base web to form a composite web, said base web being positioned atop a moving support surface and comprising a vinyl material which is compatible with said polymer web; and
    embossing said composite web with depressions in registration with said printed design.

7. A method for manufacturing a printed surface covering comprising the steps of:
    process printing a design on a continuous opaque polymer web of uniform color, said design comprising registration indicia for use in manufacturing;

laminating said printed polymer web onto a continuous base web to form a composite web, said base web being positioned atop a moving support surface and comprising a vinyl material which is comparible with said polymer web; and cutting said composite web into discrete sections so that edges of said sections are in registration with said printed design.

8. The method of claim 7 wherein said composite web is cut into individual tiles.

9. The method of claim 7 wherein said composite web is cut into individual sheets.

* * * * *